United States Patent [19]

Lynn et al.

[11] Patent Number: 5,343,323
[45] Date of Patent: Aug. 30, 1994

[54] LAN ELECTRO-OPTICAL INTERFACE

[75] Inventors: Mark A. Lynn, Warren, Ohio; Gregory D. Miller, Stanford, Calif.

[73] Assignee: General Motors Corporation, Detroit, Mich.

[21] Appl. No.: 782,176

[22] Filed: Oct. 24, 1991

[51] Int. Cl.⁵ .............................................. H04B 10/04
[52] U.S. Cl. ...................................... 359/180; 359/118
[58] Field of Search ......................... 359/118–121, 359/125, 137, 152, 174, 180, 188; 372/33

[56] References Cited

U.S. PATENT DOCUMENTS 5,214,525  5/1993  Gershmann .......................... 359/180

FOREIGN PATENT DOCUMENTS

| | | | |
|---|---|---|---|
| 2848932 | 5/1979 | Fed. Rep. of Germany | 359/180 |
| 0269048 | 6/1989 | Fed. Rep. of Germany | 359/180 |
| 0133834 | 6/1987 | Japan | 359/180 |
| 0298243 | 12/1987 | Japan | 359/180 |
| 0034734 | 2/1991 | Japan | 359/180 |
| 0201633 | 9/1991 | Japan | 359/180 |
| 3283926 | 12/1991 | Japan | 359/180 |

Primary Examiner—Leslie Pascal
Attorney, Agent, or Firm—Anthony Luke Simon

[57] ABSTRACT

A transmitter for a LAN electro-optical interface, capable of transmitting data at a rate of at least 50 MBd is disclosed. The transmitter includes a parallel gating circuit for providing a high current drive signal in response to a data signal, and a parallel resistor capacitor circuit, connected between the parallel gating circuit and a light transmitting device, for improving the leading edge response time of the light transmitting device.

14 Claims, 3 Drawing Sheets

LAN ELECTRO-OPTICAL INTERFACE

The subject of this specification is related to copending application U.S. Ser. No. 07/782,177, now U.S. Pat. No. 5,251,054, entitled "LAN Electro-Optical Interface," filed concurrently with this application, assigned to the assignee of this application, and incorporated herein by reference.

This invention relates to local area network interfaces and more particularly to an improved transmitter for a local area network interface.

BACKGROUND OF THE INVENTION

Many computer-based information systems utilize communication configurations known as Local Area Networks (LANs). Data communication in LAN systems may be implemented in various ways, including using light-wave communication. LAN light-wave communication systems typically utilize light emitting diodes (LEDs) or semiconductor lasers as light sources for a fiber-optic communications network, from which optical receivers receive the light-wave information carrying the system data.

In LAN light-wave communication systems, the speed and quality of data transfer between sending and receiving units may be limited by characteristics, such as electrical response time, of the system components. For example, if the light transmitting element is an LED, the LED has a certain response time corresponding to a time between when a data signal is received by the LED and when a corresponding light-wave signal is transmitted by the LED.

An example prior art electro-optical transmitter is shown in FIG. 1 and includes a data signal source (not shown) which provides a data signal on line 12. The signal on line 12 is coupled to LED 16 via resistor 14, which limits the current through LED 16. Assuming resistor 14 is 17 Ω and LED 16 is a Hewlett Packard ™ QFBR1590 660 nm LED, the response time of LED 16 is about 50 ns, limiting the signal transmission rate to about 10 MBd.

FIG. 2 shows a prior art circuit with improved response time of the transmitting LED. The prior art shown in FIG. 2 can achieve a rise time on LED 128 of 25.2 ns, better than twice as fast as the response time of LED 16 in FIG. 1. The prior art circuit of FIG. 2 is optimal for use with a type of high speed infrared fiber optic LEDs, often referred to as edge-emitter LEDs.

Edge emitter LEDs are characterized by a low junction capacitance. The primary cause of turn on and turn off delay in edge emitter LEDs is minority carrier lifetime. To minimize delay caused by minority carrier lifetime, resistors 124 and 126 are used to minimize minority carrier build up. Capacitor 122 provides some compensation for delays due to the junction capacitance, since the junction capacitance is small, but the circuit is unable to compensate for large junction capacitances such as in LED 16 of FIG. 1. Resistors 120 and 124 limit the DC current through LED 128.

What is desired, is a LAN electro-optical interface system with improved data transfer speed, in spite of component response time limitations.

SUMMARY OF THE INVENTION

This invention provides an improved transmitter for a LAN electro-optical interface, capable of increasing the speed of the light transmitting element, allowing for an increased baud rate of the transmitter. For example an LED rated for use at 10 MBd and below, may be used according to this invention in a system where it transmits 50 MBd or greater of information. As a result, the speed of the LAN system is enhanced without using a higher cost light transmitting element.

Structurally, this invention comprises a transmitting LED characterized by a dominant junction capacitance and a means for improving the leading edge response time of the transmitting LED, comprising a resistor and capacitor connected in parallel between a drive means and the transmitting LED. The drive means provides a high current signal in response to a data signal, wherein the transmitting LED has improved response, enabling the improved data transmission rate.

According to this invention an improved ECL to TTL conversion circuit comprising a single PNP transistor with a resistor-capacitor parallel peaking circuit may be used with the transmitter, to provide high speed ECL to TTL signal conversion.

Various other aspects of this invention are set forth in the detailed description below.

DETAILED DESCRIPTION OF THE INVENTION

Figure 3:
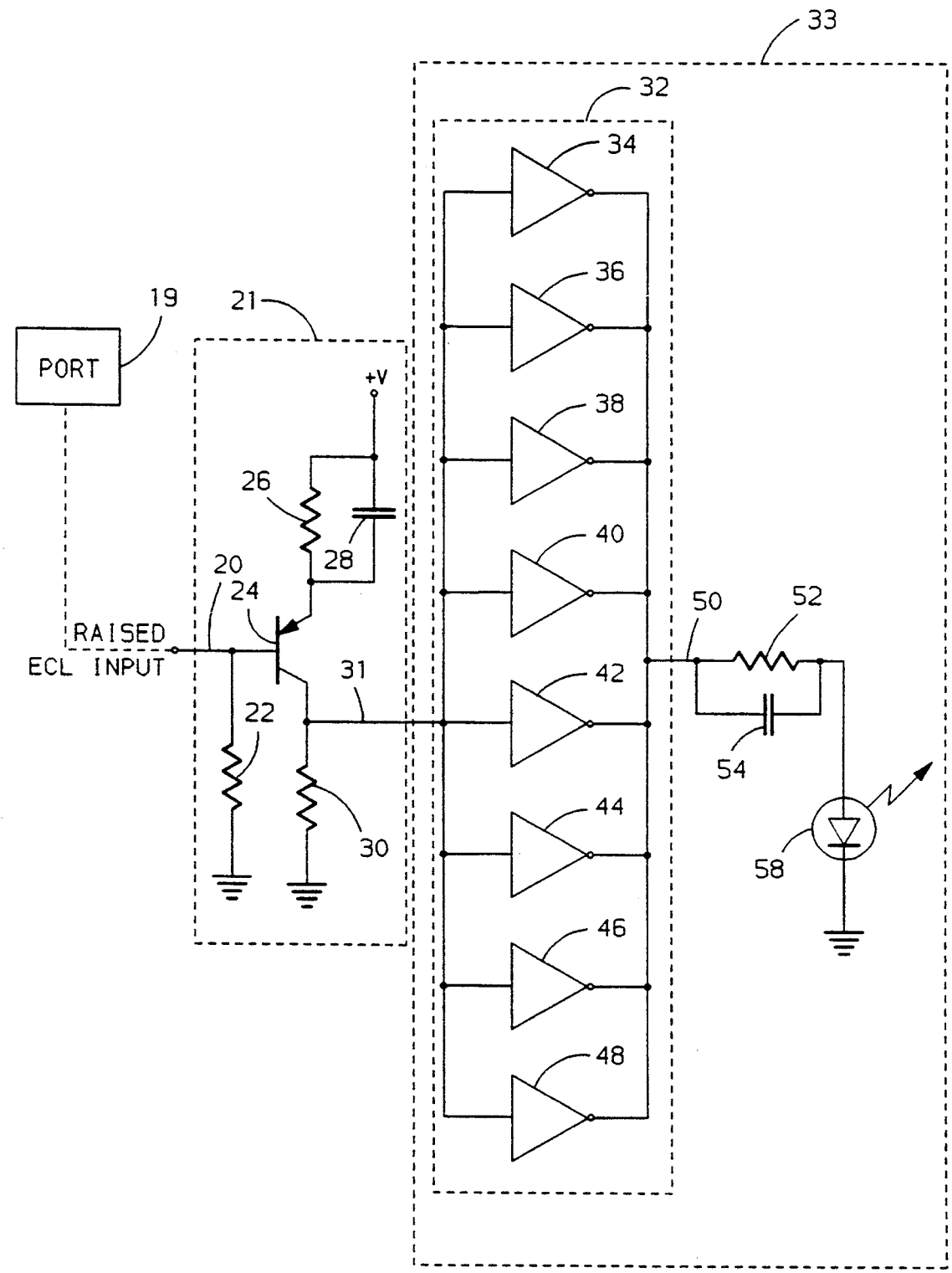
FIG. 3 is a circuit diagram of an example implementation of this invention.

The example implementation of this invention shown in FIG. 3 comprises an ECL to TTL converter circuit 21 and a peaked LED drive circuit 33. This implementation is suitable for systems in which the data signal is provided on a raised ECL circuit, which requires a signal conversion to a TTL level signal for the LED drive circuit 33. In implementations where the data signal is provided as a TTL signal, the ECL to TTL converter circuit 21 is omitted.

In drive circuit 33, the preferred implementation for LED 58, the transmitting LED, is a Hewlett Packard ™ QFBR1590 660 nm LED (LED 58), which is a large area surface emitting LED. In LEDs such as LED 58, turn on and turn off characteristics are dominated by junction capacitance, as opposed to dominance by minority carrier lifetime as in LED 128 of FIG. 2.

The circuit of this invention provides improved response time over the prior art circuits for transmitters utilizing LEDs in which the junction capacitance dominates the LED switching characteristics. LED drive circuit 33 utilizes the fast switching response of the parallel switching circuit 32 (explained below) in combination with capacitor 54 (680 pF) to artificially peak the rising edge of LED 58, improving the leading edge response time of LED 58. For example, when the output of the parallel switching circuit 32 is switched from low to high, the high current output of the parallel switching circuit 32 enables capacitor 54 to rapidly charge, causing a rush of current to flow through LED 58, forcing a quick optical response from LED 58. After capacitor 54 is charged, resistor 52 regulates the on current for LED 58.

Figure 2:
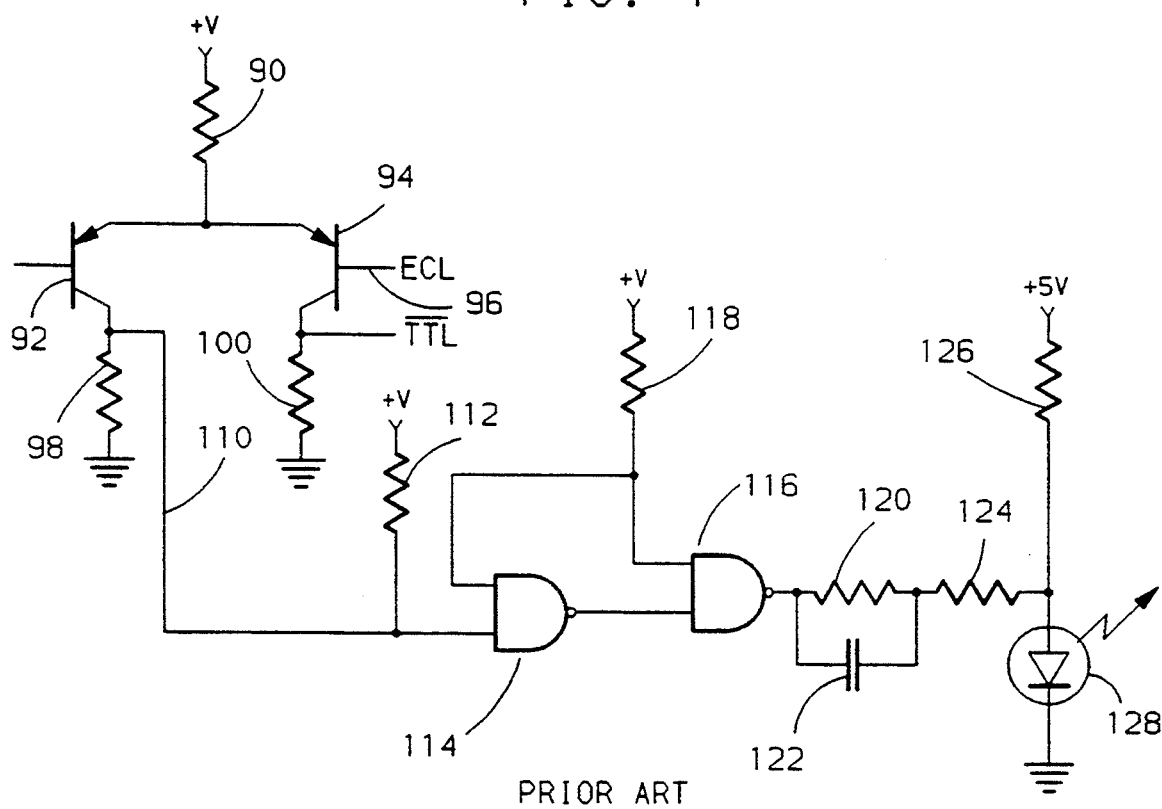
FIG. 2 is a circuit diagram of a second prior art transmitter.

Capacitor 54, e.g., 680 pF, is much larger than capacitor 122 (68 pF) in FIG. 2 to compensate for the dominant junction capacitance of LED 128. Resistors 124 and 122 from FIG. 2 are omitted in the circuit of this invention, allowing for a larger current rush into LED 128, to counteract the large junction capacitance of LED 128.

Optimal elimination of the effects of the junction capacitance of LED 128 occurs when capacitor 122 matches that junction capacitance. However, it is impossible to exactly match the junction capacitance of a surface emitting LED, since it varies strongly as a function of bias current and can range from a few picofarads at zero junction current to several microfarads at maximum rated current.

Figure 4:
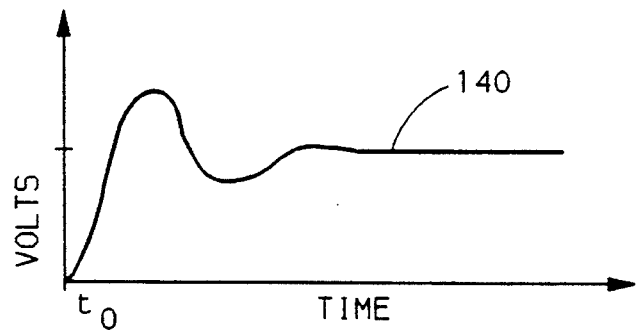
FIG. 4 is a graph showing a data signal with excessive overshoot.

While too small a value of capacitor 54 results in excess turn on time, too large a value of capacitor 54 can result in overshoot of the optical waveform, e.g., trace 140, FIG. 4. Excessive overshoot represents the presence of excess stored charge in the LED and can directly lead to errors in data transmission. Although the turn off time of LED 58 is naturally longer than the turn on time due to the nonlinearity of the junction capacitance, excess charge storage leads to even longer turn off times. If the LED is maintained in a high state, the excess stored charge is eventually dissipated in the junction of the LED. However, in systems where maximum data transmission rate is contemplated turn off times and delays for charge storage dissipation must be minimized.

Figure 5:
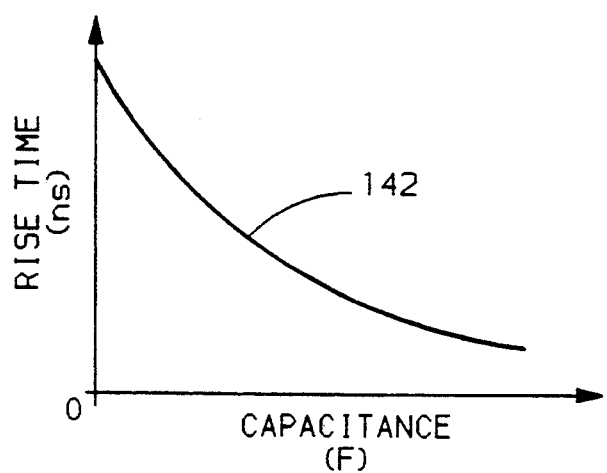
FIGS. 5 and 6 are graphs of optical waveform characteristics versus peaking capacitance.
Figure 6:
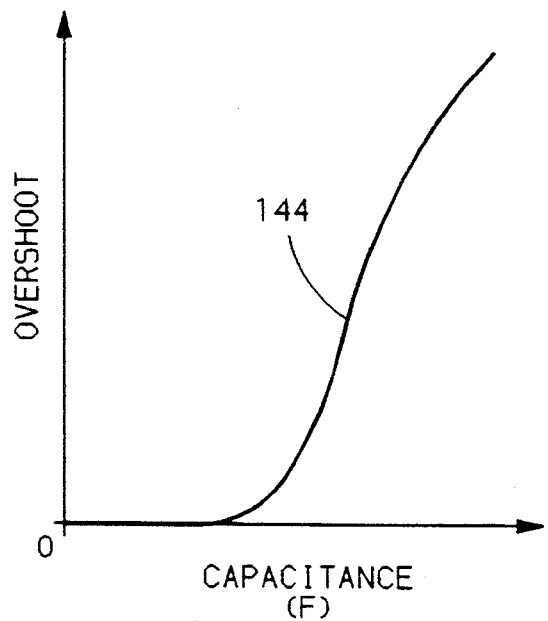

In general, in the circuit shown, as the capacitance of capacitor 54 is increased, overshoot increases, while turn on delays decrease (see traces 142 and 144 in FIGS. 5 and 6). The presence of excess storage charge increases the turn-off time, which in turn decreases the maximum data transmission rate. Also if the LED 58 is turned off just as the peak overshoot is reached, pulse width distortion could result. To minimize the occurrence of these adverse characteristics, this invention minimizes overshoot while at the same time minimizing the rise and fall times by obtaining an optimal value for capacitor 54.

The optimal value for capacitor 54 is affected by resistor 52, and may also be affected by parallel gating circuit 32. For maximum transmission distance, LED 58 is driven near its maximum rated steady state current. When LED 58 is driven near its maximum rated steady state current, resistor 52 has a relatively small resistance. Since the resistance of resistor 52 is relatively small, the output impedance of the parallel gating circuit 32 may affect the LED drive current. To minimize the affect of the output impedance of gating circuit 32, a gating circuit with relatively low output impedance is chosen.

Since the junction capacitance of LED 58 is a function of current, and since resistor 52 controls DC current through LED 58, the value of resistor 52 affects the effective junction capacitance of LED 58. Therefore the value of resistor 52 should be determined before the value for capacitor 54 is set.

Another consideration in circuit construction is the output inductance of the gating circuit 32. Substantial output inductance of parallel gating circuit 32 can lead to oscillations of the optical signal, both during turn on and turn off. The oscillations in the optical signal can lead to longer effective turn on and turn off times and data errors due to edge bounce. To prevent these oscillations, wide closely spaced circuit traces, which minimize output inductance, are used.

Referring to FIG. 6, the optimum value for capacitor 54 is selected according to the highest acceptable overshoot. Two main factors determine highest acceptable overshoot. The first factor is whether the overshoot will cause a data bit error. The second factor is the amount that the turn off time is lengthened due to the overshoot. In the example circuit given, a 15 percent overshoot is acceptable, correlating to a value of 680 pF for capacitor 54. The resulting rise time for turn on of LED 54 is 5.4 ns, slightly greater than 1/5th the rise time of the prior art shown in FIG. 2 and 1/10th the rise time of the prior art shown in FIG. 1. The resulting fall time for turn off of LED 54 is 8.4 ns (slightly greater than $\frac{1}{4}$th the 33 ns turn off time of the prior art shown in FIG. 2).

The ECL to TTL conversion is accomplished by properly biasing transistor 24 (2N3906) so that the emitter output simulates a TTL level signal. In the implementation shown, where the raised ECL input signal is provided on line 20, suitable ECL to TTL conversion is achieved by including resistor 22 (1 KΩ), resistor 26 (36 Ω), resistor 30 (110 Ω) and capacitor 28 (33 pF), providing the TTL level signal on line 31.

The improved ECL to TTL conversion circuit 21 provides advantages compared to the prior art circuit shown in FIG. 2. In the prior art, the ECL to TTL conversion is accomplished by a differential amplifier comprising transistors 92 and 96, and resistors 90, 98 and 100 connected as shown. The ECL signal input on line 96 is output as a TTL level signal on line 110.

One advantage of the ECL to TTL converter 21 of this invention is that only one transistor (24) is necessary, reducing component count. Another advantage of the ECL to TTL converter 21 of this invention is the reduced output resistance. In the prior art circuit shown in FIG. 2, the effective common emitter impedance of transistors 92 and 94 acted to limit the bandwidth of the system. In the ECL to TTL converter 21, the single collector output, coupled with the emitter peaking capacitor 28, increases the bandwidth of the ECL to TTL converter 21, resulting in an improved available data rate on line 31 without pulse-width distortion. The ECL to TTL converter 21 may be used in other ECL to TTL conversion applications.

The LED drive circuit 33 comprising this invention includes parallel switching circuit 32, which, in the example shown, comprises eight inverters 34-48 connected in parallel. The eight inverters preferably comprise a 74ACT11240 chip. The output of the parallel switching circuit 32, on line 50, drives LED 58, the light transmitting device, through resistor 52 connected in parallel with capacitor 54.

The LED drive circuit 33 is designed to obtain both the maximum power output from LED 58 and the optimal edge response times from LED 58. Each of the eight inverters of the 74ACT11240 is capable of providing 24 mA of drive current, resulting in a total potential drive current of 192 mA. This enables LED 58 to be driven at a higher drive current and up to 192 mA peaking current. Resistor 52 (17.8 Ω) is selected to regulate the drive current through LED 58.

The advantages of circuit 32 of this invention can be understood with reference to the prior art circuit comprising NAND gates 114 and 116 and resistor 118, in which the drive current for LED 128 is limited by the output current of the single NAND gate 116.

In implementing this invention, the Texas Instruments TM version of circuit 32 has additional advantages. One such advantage is the central package placement of ground and power pins, lowering package inductance. Lower package inductance lowers voltage noise spikes caused by simultaneous switching of multiple outputs. The lower voltage noise spikes reduce optical ripple in the output optical wave. Additionally, the tightly packed input and output interconnects of this chip allow for short connections to the circuit board.

Figure 7:
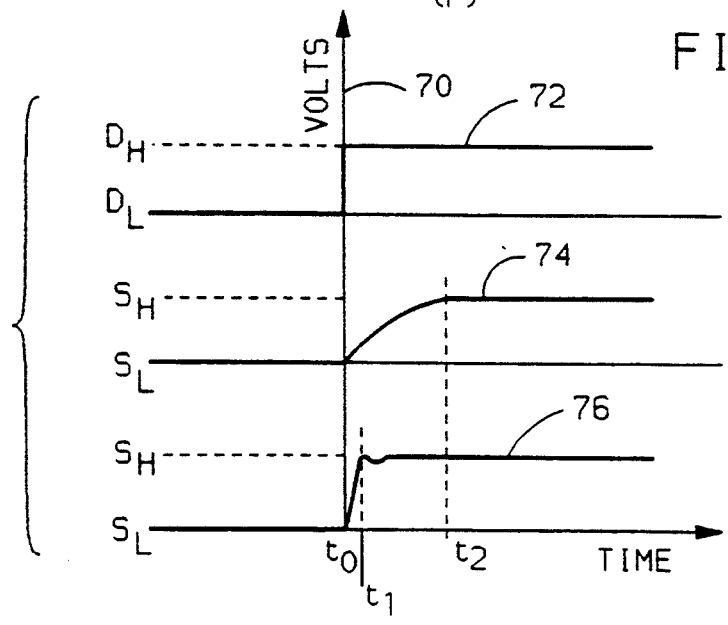
FIG. 7 is a graph showing the data signal input to the transmitter and example optical responses of a prior art circuit and the circuit of this invention.

FIG. 7 illustrates example benefits of this invention showing the improved response time of the circuit of FIG. 3. In the figure, line 72 represents an example data signal input to an electro-optical transmitter. At line 70, which represents time $t_0$, the data signal shifts levels from $D_l$ to $D_h$. Line 74 illustrates a typical LED optical output response of the prior art system shown in FIG. 1. At time $t_2$, the LED optical output achieves a signal level $S_h$. A typical time period $t_2-t_0$ for the LED to shift from output signal level $S_l$ to output signal $S_h$ is 56 ns.

Line 76 represents the LED response when the circuit of this invention, shown in FIG. 3, is used. The LED output reaches level $S_h$ at time $t_1$, where $t_1-t_0$ is typically 5.4 ns. This improved response time of the optical output of the LED is over ten times faster than the response time for the circuit shown in FIG. 1.

Figure 1:
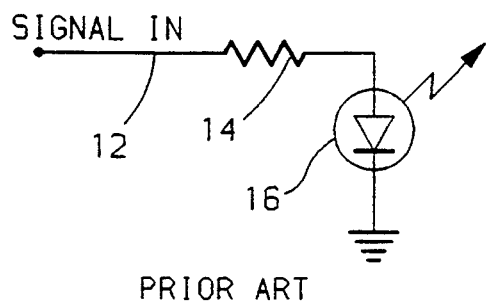
FIG. 1 is a circuit diagram of a prior art transmitter.

With the improved transmitter response time provided by this invention, the electro-optical transmitter can achieve a data transmission rate of 50 MBd or greater, which is a large improvement over the 10 MBd capabilities of the transmitter of FIG. 1.

The source of the ECL data signal for line 20 may be any standard data line coupled to a standard communication port 19, or equivalent. A variety of such ports are easily implemented by one skilled in the art. As mentioned above, this invention may be used in systems where the data port 19 provides a TTL level signal, which, in such cases, is coupled directly to line 31, the input of the parallel switching circuit 32.

Although the circuit of this invention is capable of achieving data transmission rates of 50 MBd or greater, in actual practice, the data transmission rate may be limited by other factors, such as the data receiver or other portions of the communication system. The electro-optical receiver set forth in the above-mentioned copending application, U.S. Ser. No. 07/782,177, now U.S. Pat. No. 5,251,054, is preferably used to receive light-wave data transmitted by this invention.

The above illustrated circuit is an example implementation of the preferred embodiment of this invention and is not limiting on its scope. Moreover, various improvements and modifications to this invention may occur to those skilled in the art and fall within the scope of this invention as defined below.

The embodiments of the invention in which an exclusive property or privilege is claimed are defined as follows:

1. A transmitter for a LAN electro-optical interface, comprising:
   a transmitting LED for transmitting optical data, the transmitting LED characterized by a dominant junction capacitance;
   means for improving leading edge response time of the transmitting LED, comprising a resistor and a capacitor connected in a first parallel circuit having two ends, one end connected to the transmitting LED and the other end connected to a drive circuit; and
   the drive circuit including an output connected to the first parallel circuit providing a high current drive signal in response to a data signal, wherein, in response to the drive signal, the transmitting LED transmits an optical signal and wherein the means for improving leading edge response time and the drive circuit enable a fast response time of the transmitting LED, enabling high speed data transmission, in a range greater than 10 MBd, from the transmitting LED characterized by the dominant junction capacitance.

2. The transmitter of claim 1, wherein the rise time for turn on of the transmitting LED is 5.4 ns.

3. The transmitter of claim 1, wherein the capacitor has a capacitance equal to the junction capacitance of the transmitting LED.

4. The transmitter of claim 1, wherein the drive circuit comprises a parallel gating circuit driven in response to the data signal, wherein the parallel gating circuit provides high current for peak LED edge response and wherein the resistor limits the DC current of the transmitting LED.

5. The transmitter of claim 4, wherein the parallel gating circuit comprises at least two inverter circuits connected in parallel, with an input and an output, and the data signal is coupled to the input and the drive signal occurs at the output.

6. The transmitter of claim 4, wherein the parallel gating circuit comprises eight inverter circuits connected in parallel, with an input and an output, and the data signal is coupled to the input and the drive signal occurs at the output.

7. The transmitter of claim 1, wherein the data signal is an ECL level data signal, and wherein the transmitter also comprises means, coupled to the drive circuit, for converting the ECL level data signal to a TTL level data signal.

8. The transmitter of claim 1, wherein the transmitter has a transmission rate capability of at least 50 MBd.

9. A transmitter for a LAN electro-optical interface, comprising:
   an LED for transmitting light-wave data signals;
   a transistor circuit, receiving an ECL level data signal, and providing a TTL level data signal on a TTL output line in response to the ECL level data signal;
   a parallel switching circuit comprising eight inverters connected in parallel and having an input and an output, the input connected to the TTL output line, the parallel switching circuit providing, on the output, a high current drive signal in response to the TTL level data signal;
   a circuit comprising a capacitor and resistor connected in parallel, the capacitor and resistor circuit connected between the output of the parallel switching circuit and the LED, wherein the high current drive signal and the capacitor improve leading edge response time of the light-wave data signals, improving transmission rate capability of the transmitter.

10. The transmitter set forth in claim 9 wherein the transmission rate capability of the transmitter is at least 50 MBd.

11. The apparatus set forth in claim 9, wherein the transmission rate capability of the transmitter is greater than 10 MBd.

12. A LAN electro-optical interface apparatus, comprising:

an LED for transmitting light-wave data signals;

a parallel switching circuit comprising eight inverters connected in parallel and having an input and an output, the input connected to the first line, the parallel switching circuit providing, on the output, a high current drive signal in response to a data signal;

a circuit comprising a capacitor and resistor connected in parallel between the output of the parallel switching circuit and the LED, wherein the high current drive signal and the capacitor improve leading edge response time of the light-wave data signals, improving transmission rate capability of the apparatus.

13. The apparatus of claim 12, wherein the transmission rate capability of the apparatus is at least 50 MBd.

14. The apparatus of claim 12, wherein the transmission rate capability of the apparatus is greater than 10 MBd.

* * * * *